(12) United States Patent
Soltis, Jr. et al.

(10) Patent No.: US 7,213,134 B2
(45) Date of Patent: May 1, 2007

(54) USING THREAD URGENCY IN DETERMINING SWITCH EVENTS IN A TEMPORAL MULTITHREADED PROCESSOR UNIT

(75) Inventors: Donald C. Soltis, Jr., Fort Collins, CO (US); Rohit Bhatia, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 474 days.

(21) Appl. No.: 10/092,670

(22) Filed: Mar. 6, 2002

(65) Prior Publication Data

US 2003/0172256 A1    Sep. 11, 2003

(51) Int. Cl.
*G06F 9/48* (2006.01)

(52) U.S. Cl. ............ 712/229; 712/228; 718/107; 718/102

(58) Field of Classification Search ......... 712/228, 712/229, 43; 718/102, 107, 108
See application file for complete search history.

(56) References Cited

OTHER PUBLICATIONS

Keckler, Stephen W, et al., Concurrent Event Handling through Multithreading, 1999, IEEE Transactions on Computers, vol. 48, No. 9, pp. 903-916.*

* cited by examiner

*Primary Examiner*—Donald Sparks
*Assistant Examiner*—Tonia L. Meonske

(57) ABSTRACT

A processing unit of the invention has multiple instruction pipelines for processing multi-threaded instructions. Each thread may have an urgency associated with its program instructions. The processing unit has a thread switch controller to monitor processing of instructions through the various pipelines. The thread controller also controls switch events to move from one thread to another within the pipelines. The controller may modify the urgency of any thread such as by issuing an additional instruction. The thread controller preferably utilizes certain heuristics in making switch event decisions. A time slice expiration unit may also monitor expiration of threads for a given time slice.

16 Claims, 2 Drawing Sheets

USING THREAD URGENCY IN DETERMINING SWITCH EVENTS IN A TEMPORAL MULTITHREADED PROCESSOR UNIT

BACKGROUND OF THE INVENTION

Temporal multithreading is known in the art as a technique that uses one set of execution resources to execute multiple "programs," or "threads." These execution resources often include an array of pipeline execution units. Instructions for a program thread are processed through the pipeline until it stalls; in a "switch" event, those stalled instructions are then removed and instructions from another thread are injected to the same pipeline so as to efficiently utilize execution resources.

Temporal multithreading thus gives the appearance of multiple central processing units ("CPU"). Each thread processes through the execution units as if the program had the entire control of the execution units; activation and deactivation of various threads occurs in hardware control logic based on multiple switching events in an attempt to maximally utilize the execution units.

There is a penalty associated with the above-mentioned switch events. Accordingly, the prior art has developed certain objective criteria for a switch event. In one example, a cache miss triggers a switch event because the processor needs to acquire data from main memory. In another example, a time out counter counts the cycles of a thread's execution and promotes an automatic switch for an out-of-bounds thread execution duration.

There is the need to further reduce the negative effects of switching events in high performing processors. By reducing or improving processing of switch events, a processor will have increased performance, by improving instruction processing efficiency across multiple threads. One feature of the invention is therefore to provide a processor with intelligent logic for efficiently processing and switching multithreaded programs through the processor. Several objects and other features of the invention are apparent within the description that follows.

SUMMARY OF THE INVENTION

The following patents provide useful background to the invention and are incorporated herein by reference: U.S. Pat. No. 6,188,633; U.S. Pat. No. 6,105,123; U.S. Pat. No. 5,857,104; U.S. Pat. No. 5,809,275; U.S. Pat. No. 5,778,219; U.S. Pat. No. 5,761,490; U.S. Pat. No. 5,721,865; and U.S. Pat. No. 5,513,363.

In one aspect, a processing unit of the invention has multiple instruction pipelines for processing instructions from multiple threads. Though not required, each thread may include an urgency identifier within its program instructions. The processing unit has a thread switch controller to monitor processing of instructions through the various pipelines. The thread controller also controls switch events to move from one thread to another within the pipelines. The controller may modify the urgency of any thread such as through modification of the urgency identifier.

"Urgency," as used herein, generally means an abstraction of how well a thread is progressing (or will be progressing) within a pipeline; it is also an abstraction as to how urgent the program or processor logic believes the thread should be. By way of example, a thread's urgency may be "low," "medium" or "high," or further quantized with an 3-bit identifier, thereby providing different switch event solutions to treatment of the thread in stalled pipelines. If for example a thread instruction misses the cache, the controller can lower the thread's urgency, e.g., from high to medium, or from 5 to 4. Additional cache misses can lower the thread's urgency further, such as from medium to low, or from 4 to 3. The thread controller preferably utilizes certain heuristics in making switch event decisions. Other heuristics may be used by the controller to prescribe the switch events according to certain guidelines. By way of example, processor interrupts may also modify the switch event heuristics.

The controller also preferably monitors the timing of a thread, such as to incorporate time out features with the switch event heuristics.

The invention thus provides certain advantages. Unlike the prior art, switch events are no longer "black and white" decisions that may cause negative processing effects within the pipeline. By way of example, in accord with the invention, a switch event may not automatically occur after a certain number of cycles associated with time slice expiration. That is, an assessment is also made of a thread's execution and relative to time slice expiration: if that thread is making good forward progress, it is not stalled or switched out; rather its use urgency may actually be increased to amplify the thread's activity. If however there is a stall, the next inactive thread might be activated. If on the other hand the active thread has a time slice expiration but has a higher urgency than the inactive thread, the inactive thread may remain dormant while the pipeline waits to process the active, more-urgent thread. Those skilled in the art should also appreciate that switching too late may also create processing penalties. The invention provides advantages over the prior art by adding urgency to the thread in order to encourage, or not, a switch event under appropriate heuristics.

Moreover, too many switch events may underutilize the pipeline. Once again, the invention has advantages over the prior art by reducing the underutilization of execution units, due to switch events, by making appropriate switch decisions according to preferred instruction processing policies; and these policies may be changed, dynamically or otherwise, to further reduce the underutilization. By way of example, a program thread with "low" urgency may switch immediately in the event of a stall (predicted or actual)

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE DRAWINGS

Figure 1:
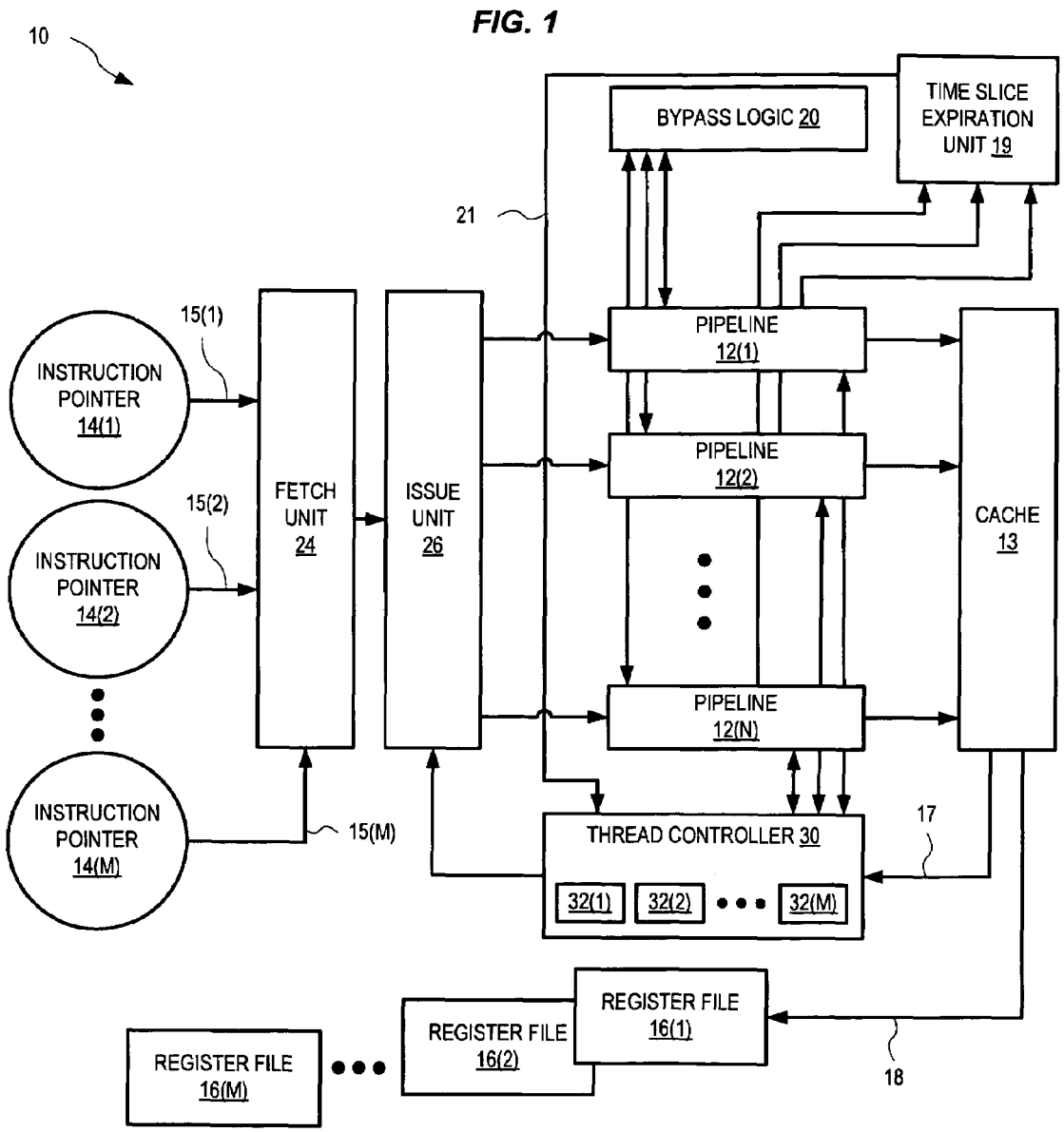
FIG. 1 schematically illustrates a processing unit of the invention for processing instructions through pipeline execution units.

FIG. 1 shows a processing unit 10 of the invention. Unit 10 is for example part of an EPIC processor to process multiple program threads through multiple pipelines 12. Pipelines 12 include an array of pipeline execution stages, known to those skilled in the art, to process instructions incrementally, such as in the fetch stage F, the register read stage R, the execute stage E, the detect exception stage D, and the write-back stage W. Thread controller 30 is illustratively shown with urgency indicators 32 that represent urgency of threads 15. For example, urgency indicator 32(1) indicates urgency of thread 15(1), urgency indicator 32(2) indicates urgency of thread 15(2) and urgency indicator 32(M) indicates urgency of thread 15(M). Unit 10 preferably has multiple instruction pointers 14(1), 14(2) . . . 14(M) to accommodate processing multiple threads 15(1), 15(2) . . . [(]15(M) through units 12. A cache 13 buffers data from associated pipelines 12 to register files 16. The plurality of register files 16(1), 16(2) . . . 16([N]M) provide per-cycle storage of data for unit 10, via bus 18; various architected states may be stored in register files 16(1), 16(2) . . . 16([N]M), including write-back data from the W stage. Bypass logic 20 may be used to accommodate bypass and speculative data transfers to and between pipelines 12 and register file 16.

Instructions are dispatched to pipelines 12 by a fetch unit 24 in communication with an instruction pointer 14. An issue unit 26 may be used to couple instructions into pipelines 12 for execution therethrough.

Unit 10 also includes a thread controller 30. Controller 30 monitors processing of threads within pipelines 12; it also defines the switch events that deactivate and activate multiple threads within pipelines 12 to perform multithreading. In the event of a switch event, instructions from current threads are routed through controller 30 via bus 17.

A time slice expiration unit 19 may also couple to unit 10 to monitor time slice expiration of any thread 15 within pipelines 12. Unit 19 couples with thread controller 30, via bus 21, to indicate an expiration event. In such an event, and as described below, thread controller 30 may switch out the current thread, or not, based on the urgency for that thread.

Thread controller 30 utilizes the urgency of various threads processed within unit 10 to define the switch events. By way of example, controller 30 may monitor a time slice expiration of a thread within pipelines 12 and elect to switch that thread out, or not, based on the urgency of the thread. Controller 30 may also modify the urgency of a thread, such as by injecting an instruction into the pipeline. For example, if a thread repeatedly has cache misses, controller 30 may repeatedly lower the urgency of the thread, for example lowering the urgency bits of the thread's instructions from 3, to 2, to 1. In still another example, thread controller 30 monitors processor interrupts for a given thread; it may again adjust the thread's urgency based on the interrupts.

Figure 2:
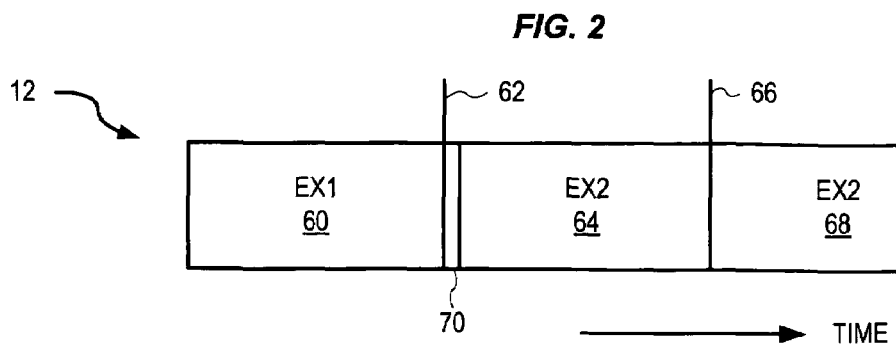
FIG. 2 shows an exemplary switch event within a pipeline of the invention.

For purposes of illustration, FIG. 2 illustrates a switch event 70 defined by controller 30 within a pipeline 12. A first thread, illustratively with a "low" urgency, is executed (EX1) in a stage 60 of pipeline 12. That thread stalls at time 62 due to a cache miss. Controller 30 switches the first thread out, at switch event 70, and activates a second thread, illustratively with a "high" urgency.

The invention thus provides for executing instructions from other threads in the event a current thread stalls in the pipeline (e.g., EX1), such as through a cache miss that results in a long latency memory operation. More particularly, switch event 70 causes only a minor delay in pipeline 12. Stall 62 is covered by continued execution of another thread through the pipeline; specifically, the second thread continues execution (EX2) within pipeline 12 at stage 64. The second thread may also stall at time 66; however no switch event occurs, in this example, because the second thread has higher urgency than the first thread. Accordingly, stall 66 is covered by continued execution of the second thread within execution (EX2) within pipeline 12 at stage 68.

Figure 3:
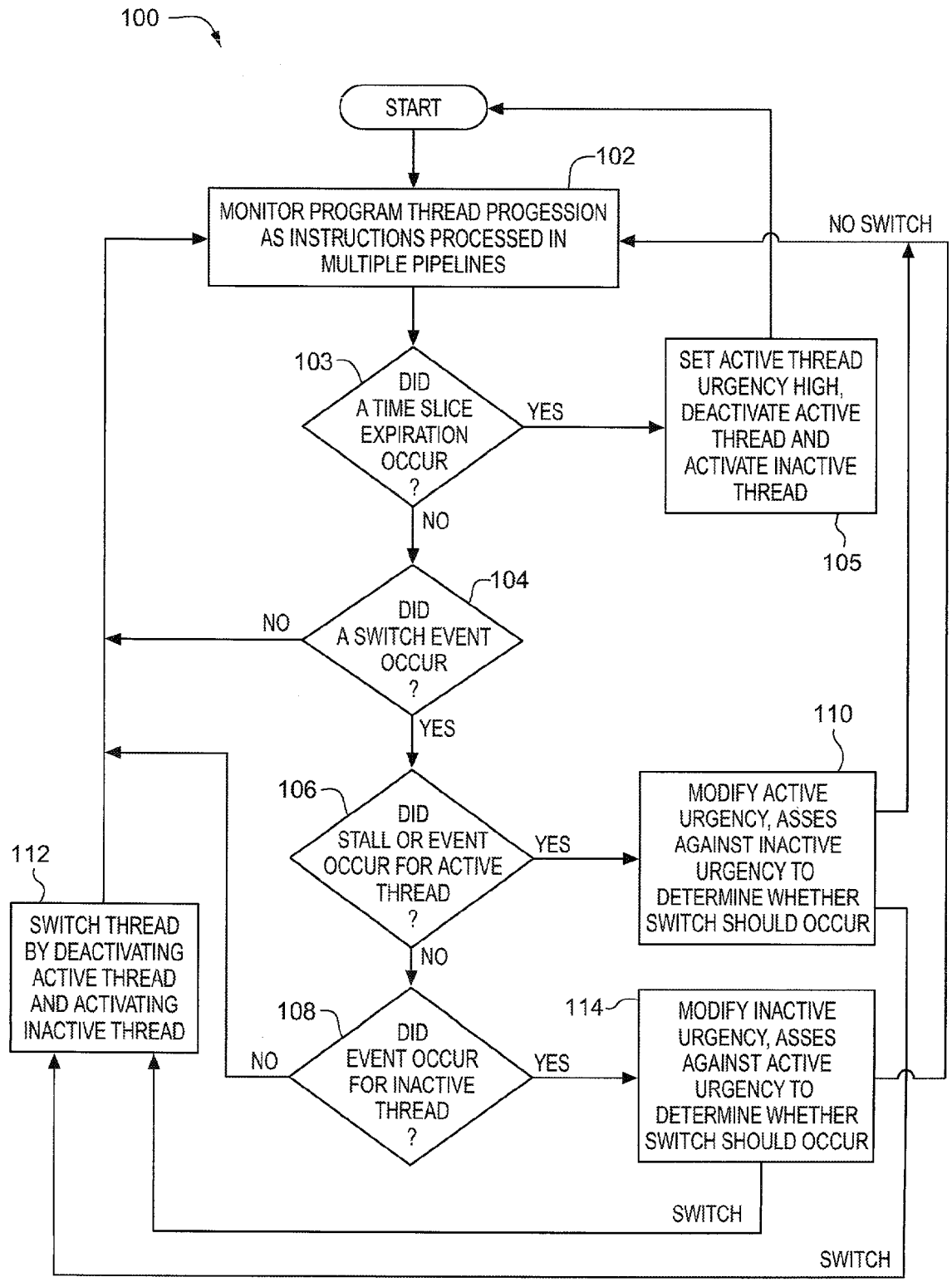
FIG. 3 shows a flowchart illustrating the use of urgency with multithreading, in accord with the invention.

FIG. 3 shows a flowchart 100 illustrating certain non-limiting thread controller operations of the invention. After start, in step 102, the thread controller monitors processing of instructions within an array of pipelines. In step 103, the time slice expiration unit assesses whether a time slice expiration occurs. If no, processing continues to step 104. In the event a time slice expiration occurs, the active thread urgency is set to high and deactivated, and the inactive thread is activated, at step 105. Monitoring of another thread then starts anew, as shown.

In the event of a possible switch event, step 104, the thread controller assesses whether the event is for an active thread (step 106) or an inactive thread (step 108). If the event is associated with an active thread, the active thread urgency is modified and assessed against the inactive thread urgency to determine whether to switch, or not, at step 110. If the urgencies do not warrant a switch, monitoring continues at step 102. If the urgencies do warrant a switch, then a switch occurs at step 112. At step 112, the active thread is deactivated and the inactive thread is activated.

If the event from step 104 is for an inactive thread, step 108, then the inactive thread urgency is modified and assessed against the active thread urgency to determine whether to switch, or not, at step 114. If the urgencies do not warrant a switch, monitoring continues at step 102. As above, if the urgencies do warrant a switch, then a switch occurs at step 112. At step 112, the active thread is deactivated and the inactive thread is activated.

Accordingly, the invention assesses a thread's urgency to decide whether the current thread should be switched out of the pipeline or not (steps 110, 114). A modification of the thread's urgency may also occur by operation of thread controller 30, such as by issuing an instruction to "hint" of a new thread urgency. If switched out, the next thread is activated within the pipeline. The controller then continues to monitor instruction progress of the new thread in the pipeline (step 102). Thread switches may occur by flushing the pipeline and switching to another architected state (e.g., via pointers to the register file and stored in the thread switch controller); the fetching of instructions from the new thread then commences. If the current thread is not switched out, for example if its urgency is very high, then it may not be switched out and the continued monitoring (step 102) occurs for the same thread.

The invention thus attains the objects set forth above, among those apparent from the preceding description. Since certain changes may be made in the above methods and systems without departing from the scope of the invention, it is intended that all matter contained in the above description or shown in the accompanying drawing be interpreted as illustrative and not in a limiting sense. It is also to be understood that the following claims are to cover all generic and specific features of the invention described herein, and all statements of the scope of the invention which, as a matter of language, might be said to fall there between.

What is claimed is:

1. A method for determining thread switch points within pipeline execution units of a processor, comprising the steps of:

monitoring instruction processing of a first thread within the pipeline execution units;

in the event of a possible switch point within the pipeline execution units, deactivating the first thread, or not, based upon a first urgency indicator for the first thread, the first urgency indicator being based upon progress of the first thread within the pipeline execution units, further comprising deactivating the first thread and activating a second thread based upon a second urgency indicator for the second thread, the second urgency indicator being based upon expected progress of the second thread within the pipeline execution units.

2. A method of claim 1, further comprising deactivating the second thread, or not, based upon the second urgency indicator for the second thread and in the event of a possible switch point event of the second thread.

3. A method of claim 2, further comprising activating another thread within the pipeline if the second thread is switched out.

4. A method of claim 1, the step of monitoring comprising utilizing a thread controller coupled with the execution units.

5. A method of claim 1, further comprising modifying the first urgency indicator to increase or alternatively decrease urgency of the first thread based upon characteristics associated with the possible switch point.

6. A method of claim 5, further comprising determining whether a time slice expiration occurred.

7. A method of claim 6, further comprising utilizing a time slice expiration unit.

8. A method of claim 5, further comprising determining whether a cache miss occurred.

9. A method of claim 5, further comprising inserting an instruction to the pipeline to change urgency of the thread.

10. A method of claim 1, further comprising the steps of deactivating the first thread and activating a second thread, and modifying urgency of the second thread.

11. A processor for processing multi-threaded program instructions, comprising:
   an array of pipeline execution units and associated heuristics affecting how the instructions are processed within the units; and
   a thread controller for monitoring processing of the instructions within the units and for switching between multiple program threads based upon (a) the heuristics and (b) urgencies of the program threads;
   wherein the urgencies are based upon (a) progress of the threads through the pipeline execution units and (b) expected progress of the program threads through the pipeline execution units.

12. A processor of claim 11, the heuristics comprising one or more of time slice expiration heuristics, cache miss heuristics and processor interrupt heuristics.

13. A processor of claim 11, the program threads comprising one or more instructions, one of the instructions changing urgency for at least one thread of the processor.

14. A processor of claim 11, the controller modifying an urgency of any of the threads to modify future treatment of the threads in switch out events.

15. A processor of claim 14, the controller either decreasing or increasing urgency for the program threads by injecting an instruction to the pipeline execution units.

16. A processor of claim 11, further comprising a time slice expiration unit for monitoring expiration of threads within the processor.

* * * * *

UNITED STATES PATENT AND TRADEMARK OFFICE
CERTIFICATE OF CORRECTION

PATENT NO.         : 7,213,134 B2
APPLICATION NO.    : 10/092670
DATED              : May 1, 2007
INVENTOR(S)        : Donald C. Soltis, Jr. et al.

It is certified that error appears in the above-identified patent and that said Letters Patent is hereby corrected as shown below:

In column 3, line 12, delete "[(]15(M)" and insert -- 15(M) --, therefor.

In column 3, line 14, delete "16([N]M)" and insert -- 16(M) --, therefor.

In column 3, line 17, delete "16([N]M)" and insert -- 16(M) --, therefor.

Signed and Sealed this

Twenty-sixth Day of August, 2008

JON W. DUDAS
*Director of the United States Patent and Trademark Office*